US009613574B2

(12) United States Patent
Wang

(10) Patent No.: US 9,613,574 B2
(45) Date of Patent: Apr. 4, 2017

(54) SWITCH CIRCUIT TO CONTROL THE FLOW OF CHARGES IN THE PARASITIC CAPACITANCE OF A TFT IN THE PIXEL OF A DISPLAY

(71) Applicants: BOE TECHNOLOGY GROUP CO., LTD., Beijing (CN); BEIJING BOE DISPLAY TECHNOLOGY CO., LTD., Beijing (CN)

(72) Inventor: Jieqiong Wang, Beijing (CN)

(73) Assignees: BOE TECHNOLOGY GROUP CO., LTD. (CN); BEIJING BOE DISPLAY TECHNOLOGY CO., LTD. (CN)

(*) Notice: Subject to any disclaimer, the term of this patent is extended or adjusted under 35 U.S.C. 154(b) by 127 days.

(21) Appl. No.: 14/422,410

(22) PCT Filed: Dec. 17, 2013

(86) PCT No.: PCT/CN2013/089660
§ 371 (c)(1),
(2) Date: Feb. 19, 2015

(87) PCT Pub. No.: WO2015/000273
PCT Pub. Date: Jan. 8, 2015

(65) Prior Publication Data
US 2015/0235601 A1 Aug. 20, 2015

(30) Foreign Application Priority Data
Jul. 1, 2013 (CN) .......................... 2013 1 0271807

(51) Int. Cl.
G09G 3/36 (2006.01)
(52) U.S. Cl.
CPC ......... G09G 3/3607 (2013.01); G09G 3/3655 (2013.01); G09G 2300/0819 (2013.01);
(Continued)

(58) Field of Classification Search
CPC .......................... G09G 2300/0814–2300/0819
See application file for complete search history.

(56) References Cited

U.S. PATENT DOCUMENTS 5,606,340 A * 2/1997 Suzuki ................. G09G 3/3648
257/173
6,304,305 B1 * 10/2001 Matsumoto ....... G02F 1/136204
345/87
(Continued)

FOREIGN PATENT DOCUMENTS

CN 1893088 1/2007
CN 102879967 1/2013
(Continued)

OTHER PUBLICATIONS

Patel, Chintan. "Capacitance Resistance Model." (n.d.): n. pag. Web. Jan. 1, 2007. <http://www.csee.umbc.edu/~cpatel2/links/315/lectures/chap2_lect06_rc_model.pdf>.*
(Continued)

Primary Examiner — Chanh Nguyen
Assistant Examiner — Navin Lingaraju
(74) Attorney, Agent, or Firm — BakerHostetler LLP

(57) ABSTRACT

The present disclosure provides an array substrate, a display panel and a display device. The array substrate includes: a plurality of data lines and a plurality of gate lines configured to divide a display region into a plurality of display sub-regions; a pixel electrode arranged at each display sub-region; and a TFT arranged at each display sub-region, a source electrode of the TFT being electrically connected to the data line, a drain electrode thereof being electrically connected to the pixel electrode and a gate electrode thereof being electrically connected to the gate line, wherein a parasitic capacitor is formed between the gate electrode and the drain electrode of the TFT. The array substrate further includes a switch circuit configured to enable both ends of (Continued)

the parasitic capacitor to be electrically connected when a gate driving signal of the TFT is changed from a high level to a low level.

15 Claims, 3 Drawing Sheets

(52) U.S. Cl.
CPC ........... *G09G 2300/0876* (2013.01); *G09G 2320/0233* (2013.01)

(56) References Cited

U.S. PATENT DOCUMENTS

| | | | |
|---|---|---|---|
| 6,914,643 B1* | 7/2005 | Nagase | G02F 1/136204 349/40 |
| 7,408,198 B2 | 8/2008 | Liu | |
| 8,179,644 B2* | 5/2012 | Huang | G09G 3/3611 361/56 |
| 2003/0067424 A1* | 4/2003 | Akimoto | G09G 3/3258 345/55 |
| 2004/0008053 A1* | 1/2004 | Nara | G09G 3/006 324/760.02 |
| 2004/0189884 A1* | 9/2004 | Kim | G02F 1/136213 349/38 |
| 2005/0243036 A1* | 11/2005 | Ikeda | G09G 3/3233 345/76 |
| 2006/0007215 A1* | 1/2006 | Tobita | G09G 3/3241 345/204 |
| 2006/0077134 A1* | 4/2006 | Hector | G09G 3/3233 345/76 |
| 2008/0079860 A1* | 4/2008 | Kunimori | G02F 1/13318 349/43 |
| 2012/0105501 A1* | 5/2012 | Nakamura | G09G 3/3233 345/690 |
| 2014/0111721 A1* | 4/2014 | Chen | G02F 1/136213 349/43 |

FOREIGN PATENT DOCUMENTS

| | | |
|---|---|---|
| CN | 103105712 | 5/2013 |
| CN | 103336397 | 10/2013 |
| JP | 2001005037 | 1/2001 |
| JP | 2004302414 | 10/2004 |
| JP | 2007305641 | 11/2007 |

OTHER PUBLICATIONS

First Office Action, App. No. 2013102718074, dd Apr. 3, 2015.

* cited by examiner

SWITCH CIRCUIT TO CONTROL THE FLOW OF CHARGES IN THE PARASITIC CAPACITANCE OF A TFT IN THE PIXEL OF A DISPLAY

CROSS-REFERENCE TO RELATED APPLICATION

This application is the U.S. national phase of PCT Application No. PCT/CN2013/089660 filed on Dec. 17, 2013, which claims a priority of the Chinese Patent Application No. 201310271807.4 filed on Jul. 1, 2013, the disclosures of which are incorporated in their entirety by reference herein.

TECHNICAL FIELD

The present disclosure relates to the field of display technology, in particular to an array substrate, a display panel and a display device.

BACKGROUND

A liquid crystal display device has currently been widely used as a flat-panel display device due to such advantages as low power consumption, being light and free of radiation as compared with the other display devices.

Usually, the liquid crystal display device includes an array substrate, a color filter substrate and a liquid crystal layer. As shown in FIG. 1, a display region on the array substrate includes a plurality of display sub-regions, and each display sub-region is usually surrounded by two gate lines 101 (scanning lines) and two data lines 102.

As shown in FIG. 1, a thin film transistor (TFT) 103 and a pixel electrode 104 are arranged inside the display sub-region. A voltage applied to a common electrode and/or the pixel electrode 104 on the color filter substrate may be controlled so as to control an intensity of an electric field between the color filter substrate and the array substrate, thereby to control a deflection direction of liquid crystal molecules.

During the operation, the TFT is turned on under the control of a gate driving signal, and a data voltage at a corresponding row is applied to the corresponding pixel electrode 104 by a source electrode, so as to change the intensity of the electric field between the color filter substrate and the array substrate, thereby to affect the deflection of the liquid crystal molecules.

However, in the array substrate, a gate electrode 1031 and a drain electrode 1032 of the TFT 103 are arranged opposite to each other at some regions, and when a voltage between the gate electrode 1031 and the drain electrode 1032 changes, a parasitic capacitor $C_{gd}$ will occur. FIG. 1 shows its equivalent circuit.

At a moment when the voltage applied to the gate electrode is changed from a turn-on voltage $V_{gh}$ to a turn-off voltage $V_{gl}$, charges inside the parasitic capacitor $C_{gd}$ will move due to a sudden change in the voltage applied to the gate electrode. Once the charges move, a voltage across $C_{gd}$ will be changed. The change of the voltage will be transferred to the pixel electrode 104 via the drain electrode, resulting in a change in the intensity of the electric field between the color filter substrate and the array substrate, and thereby resulting in a change in a deflection angle of the liquid crystal molecules. As a result, the transmittance will be adversely affected and thereby the grayscale display of an image will be inaccurate.

SUMMARY

An object of the present disclosure is to provide an array substrate, a display panel and a display device, so as to reduce the influence of a parasitic capacitor between a gate electrode and a drain electrode on the display.

In one aspect, the present disclosure provides an array substrate, including:
a plurality of data lines and a plurality of gate lines, configured to divide a display region into a plurality of display sub-regions;
a pixel electrode arranged at each display sub-region; and
a TFT arranged at each display sub-region, a source electrode of the TFT being electrically connected to the data line, a drain electrode of the TFT being electrically connected to the pixel electrode and a gate electrode of the TFT being electrically connected to the gate line.

A parasitic capacitor is formed between the gate electrode and the drain electrode of the TFT. The array substrate further includes a switch circuit configured to enable both ends of the parasitic capacitor to be electrically connected when a gate driving signal of the TFT is changed from a high level to a low level.

In the array substrate, the switch circuit may include:
a first switch unit arranged at at least one display sub-region, and connected in parallel to the parasitic capacitor formed on the TFT at the corresponding display sub-region,
wherein one end of a parallel circuit formed by the parasitic capacitor and the first switch unit is electrically connected to the drain electrode of the TFT, and another end of the parallel circuit is electrically connected to the gate electrode of the TFT, and
the first switch unit is in an ON state when the gate driving signal of the TFT at the corresponding display sub-region is changed from a high level to a low level, and otherwise the first switch unit is in an OFF state.

In the array substrate, an external controller may be used to control the first switch unit to be in the ON state when the gate driving signal is changed from a high level to a low level, and otherwise control the first switch unit to be in the OFF state.

In the array substrate, the external controller may be provided with respect to each row of gate lines, and a signal from the external controller may be in synchronization with the gate driving signal of the corresponding gate line.

In the array substrate, the first switch unit may be a TFT element, a gate electrode of which is connected to the external controller, a source electrode of which is connected to the gate electrode of the TFT, and a drain electrode of which is connected to the drain electrode of the TFT.

In the array substrate, the switch circuit may include:
a first switch unit arranged at at least one display sub-region, and connected in parallel to the parasitic capacitor formed on the TFT at the corresponding display sub-region; and
a second switch unit arranged in correspondence with the first switch unit,
wherein one end of a parallel circuit formed by the parasitic capacitor and the first switch unit is electrically connected to the drain electrode of the TFT, and another end of the parallel circuit is electrically connected to the gate electrode of the TFT via the second switch unit, and
the first switch unit is in an ON state and the second switch unit is in an OFF state when the gate driving signal of the TFT at the corresponding display sub-region is changed from a high level to a low level.

In the array substrate, the first switch element may be a first TFT which is in an OFF state when its gate electrode is at a high level, the second switch unit may be a second TFT which is in an ON state when its gate electrode is at a high level, and the gate electrodes of the first TFT and the second TFT are electrically connected to the gate line.

In the array substrate, an external controller may be provided with respect to each row of gate lines, and a signal from the external controller may be in synchronization with the gate driving signal of the corresponding gate line. The first switch unit may be a first TFT which is in an OFF state when its gate electrode is at a high level, the second switch unit may be a second TFT which is in an ON state when its gate electrode is at a high level, and the gate electrodes of the first TFT and the second TFT are electrically connected to the external controller.

In another aspect, the present disclosure provides a display panel including the above-mentioned array substrate.

In yet another aspect, the present disclosure provides a display device including the above-mentioned display panel.

The present disclosure at least has the following advantageous effects. Due to the existence of the switch circuit, both ends of the parasitic capacitor will be electrically connected when the gate driving signal of the TFT is changed from a high level to a low level. Once both ends of the parasitic capacitor are electrically connected, they will be at an identical potential. In this case, the parasitic capacitor will be neither discharged nor charged, i.e., charges will not move within the parasitic capacitor. Because the parasitic capacitor will not be affected when the gate driving signal of the TFT is changed from a high level to a low level, no influence will be impacted on voltages applied to the drain electrode and the pixel electrode electrically connected to the drain electrode, i.e., the pixel electrode may be maintained at a voltage after a charging. As a result, it is able to reduce the influence of the parasitic capacitor between the gate electrode and the drain electrode on the voltage of the pixel electrode, thereby to improve a display effect.

DETAILED DESCRIPTION

According to an array substrate, a display panel and a display device of the present disclosure, a switch circuit is provided so as to enable both ends of a parasitic capacitor to be electrically connected when a gate driving signal of a TFT is changed from a high level to a low level, so that such a phenomenon as charge movement will not occur within the parasitic capacitor. As a result, it is able to reduce the influence of the parasitic capacitor between a gate electrode and a drain electrode on a voltage across a pixel electrode, thereby to improve a display effect.

An array substrate in an embodiment of the present disclosure includes:

a plurality of data lines and a plurality of gate lines configured to divide a display region into a plurality of display sub-regions;

a pixel electrode arranged at each display sub-region; and a TFT arranged at each display sub-region, a source electrode of the TFT being electrically connected to the data line, a drain electrode thereof being electrically connected to the pixel electrode and a gate electrode thereof being electrically connected to the gate line.

A parasitic capacitor is formed between the gate electrode and the drain electrode of the TFT. The array substrate further includes a switch circuit configured to enable both ends of the parasitic capacitor to be electrically connected when a gate driving signal of the TFT is changed from a high level to a low level.

According to the array substrate in this embodiment, due to the existence of the switch circuit, both ends of the parasitic capacitor will be electrically connected when the gate driving signal of the TFT is changed from a high level to a low level. Once both ends of the parasitic capacitor are electrically connected, they will be at an identical potential. In this case, the parasitic capacitor will be neither discharged nor charged, i.e., charges will not move within the parasitic capacitor.

As mentioned above, because the parasitic capacitor will not be affected when the gate driving signal of the TFT is changed from a high level to a low level, no influence will be impacted on voltages applied to the drain electrode and the pixel electrode electrically connected to the drain electrode, i.e., the pixel electrode which has been charged will be maintained at a voltage. As a result, it is able to reduce the influence of the parasitic capacitor between the gate electrode and the drain electrode on the voltage across the pixel electrode, thereby to improve a display effect.

In specific embodiments, the switch circuit may be implemented in various modes, and some of them will be described hereinafter.

<Implementation Mode 1 for Switch Circuit>

Figure 2:
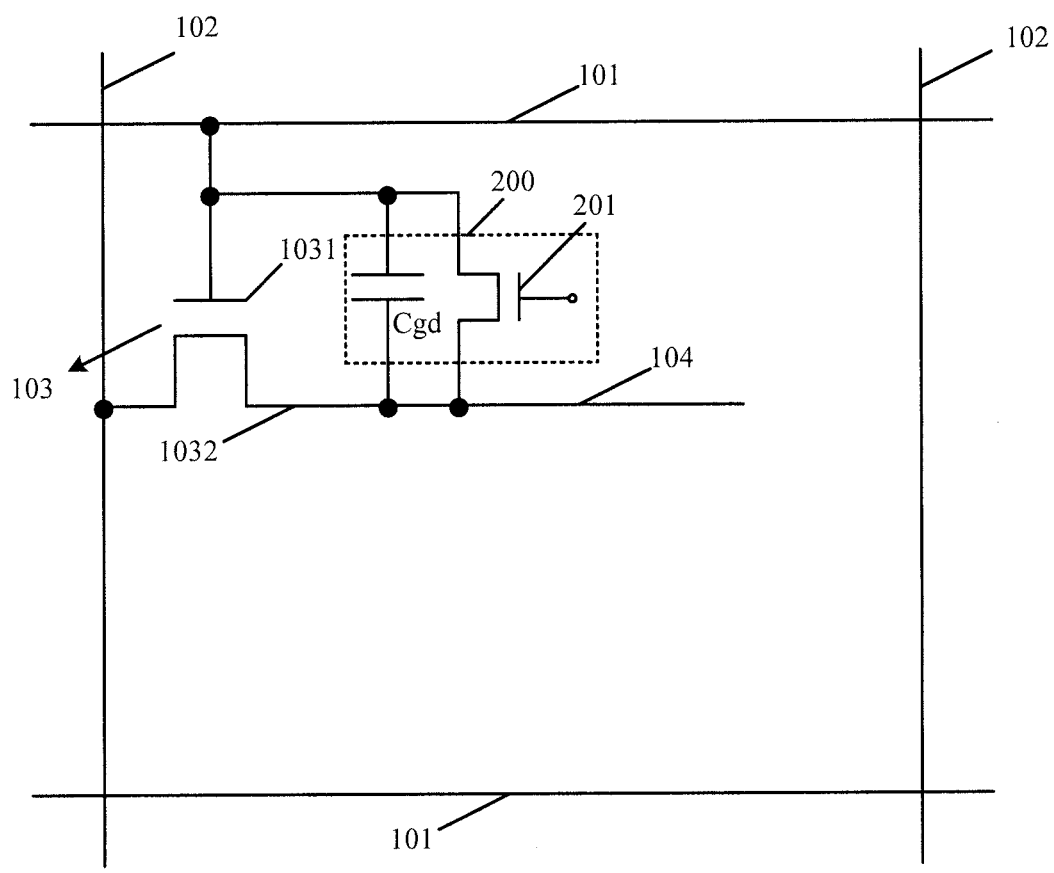
FIG. 2 is an equivalent circuit diagram of an array substrate according to an embodiment of the present disclosure.

In this mode, the switch circuit may be implemented by merely one switch unit. As shown in FIG. 2, the switch circuit includes a first switch unit 201 arranged at at least one display sub-region. Both ends of the first switch unit 201 are connected to two ends of the parasitic capacitor $C_{gd}$ formed on the TFT at the corresponding display sub-region, respectively, and an ON state and an OFF state of the first switch unit 201 are controlled by means of an external controller (not shown).

The parasitic capacitor $C_{gd}$ and the first switch unit 201 form a parallel circuit 200, one end of which is electrically connected to a drain electrode 1032 of a TFT 103, and another end of which is electrically connected to a gate electrode 1031 of the TFT 103.

When the gate driving signal of the TFT at the corresponding display sub-region is changed from a high level to a low level, i.e., within a time period in which the gate driving signal is changed from a high level to a low level until it is stabilized at the low level, the external controller is used to control the first switch unit 201 to be in the ON state; and within a time period other than the above-mentioned time period, the external controller is used to control the first switch unit 201 to be in the OFF state.

In addition, one external controller may be provided with respect to each row of gate lines, and a signal from the external controller may be in synchronization with the gate driving signal of the corresponding gate line.

As shown in FIG. 2, the first switch unit 201 may be a TFT element, a gate electrode of which is connected to the external controller, a source electrode of which is connected to the gate electrode 1031 of the TFT 103, and a drain electrode of which is connected to the drain electrode 1032 of the TFT 103, or any other switch element.

In this mode, when the gate driving signal is changed from a high level to a low level, the first switch unit will be in the ON state. At this time, both ends of the parasitic capacitor $C_{gd}$ will be electrically connected and at an identical potential, so that the parasitic capacitor will be neither discharged nor charged. Therefore, a change in the level of the gate driving signal will not be transferred to the pixel electrode via the parasitic capacitor $C_{gd}$, thus the voltage across the pixel electrode which has been charged will not be changed, and an electric field between the pixel electrode and the common electrode will remain unchanged. As a result, it is able to achieve accurate grayscale display at the display sub-region, thereby to improve a display effect.

<Implementation Mode 2 for Switch Circuit>

In the above mode 1, it is required to control the first switch unit 201 to be in the ON state merely within the time period when the gate driving signal is changed from a high level to a low level until it is stabilized at the low level, and to control the first switch unit 201 to be in the OFF state within a time period other than the above-mentioned time period. Brief explanation will be given as follows.

Taking the structure in FIG. 2 as an example, when the gate driving signal is at a high level, it will be applied to the pixel electrode if the first switch unit 201 is in the ON state, and the pixel electrode will be thus charged wrongly. When the gate driving signal is at a low level, it will be applied to the pixel electrode if the first switch unit 201 is in the ON state, and the pixel electrode will thus be discharged.

Hence, the first switch unit 201 can merely be in the ON state within the time period in which the gate driving signal is changed from a high level to a low level until it is stabilized at the low level, but must be in the OFF state within the other time period.

It can be found that, there is a high requirement on control accuracy of the first switch unit in the mode 1, i.e., on control accuracy of the external controller; otherwise, the voltage across the pixel electrode may be changed inappropriately.

Figure 3:
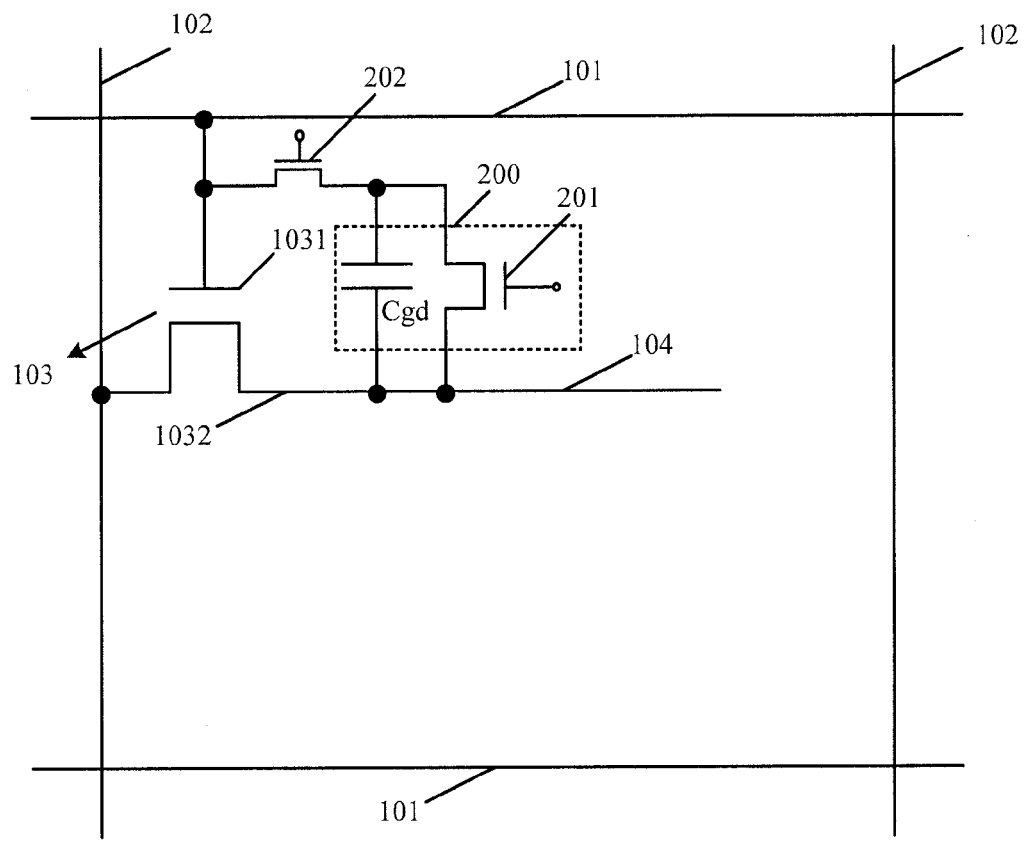
FIG. 3 is another equivalent circuit diagram according to an embodiment of the present disclosure.

In order to reduce the control accuracy, in an embodiment as shown in FIG. 3, the switch circuit in the mode 2 includes the first switch unit 201 arranged at at least one display sub-region, and a second switch unit 202 arranged in correspondence with the first switch unit. Both ends of the first switch unit 201 are connected to two ends of the parasitic capacitor $C_{gd}$ formed on the TFT at the corresponding display sub-region, respectively. How to control the ON and OFF states of the first switch unit 201 will be described later.

The parasitic capacitor $C_{gd}$ and the first switch unit 201 form the parallel circuit 200, one end of which is electrically connected to the drain electrode 1032 of the TFT 103, and another end of which is electrically connected to the gate electrode 1031 of the TFT 103 via the second switch unit 202. In other words, one end of the second switch unit 202 is electrically connected to one end of the parallel circuit 200, and another end thereof is electrically connected to the gate electrode 1031 of the TFT. How to control ON and OFF states of the second switch unit 202 will be described later. When the gate driving signal of the TFT at the corresponding display sub-region is changed from a high level to a low level, i.e., within the time period in which the gate driving signal is changed from a high level to a low level until it is stabilized at the low level, the first switch unit 201 will be in the ON state and the second switch unit 202 will be in the OFF state. When the gate driving signal of the TFT at the corresponding display sub-region is at a high level, i.e., within a time period in which the gate driving signal is at a high level, the second switch unit 202 will be in the ON state, and the first switch unit 201 will be in the OFF state.

In the mode 2, when the gate driving signal is changed from a high level to a low level, the first switch unit 201 will be in the ON state, and the second switch unit 202 will be in the OFF state. At this time, the gate driving signal will not be transferred to the pixel electrode, and thus the pixel electrode will not be adversely affected. In addition, when the first switch unit 201 is in the ON state, both ends of the parasitic capacitor $C_{gd}$ will be electrically connected and at an identical potential, so the parasitic capacitor will be neither discharged nor charged. A change in the level of the gate driving signal will not be transferred to the pixel electrode via the parasitic capacitor $C_{gd}$, thus the voltage of the pixel electrode which has been charged will not be changed, and an electric field between the pixel electrode and the common electrode will remain unchanged. As a result, it is able to achieve accurate grayscale display at the display sub-region, thereby to improve the display effect.

When the gate driving signal of the TFT at the corresponding display sub-region is at a high level, the second switch unit 202 is controlled to be in the ON state, and the first switch unit 201 is controlled to be in the OFF state. At this time, an actual equivalent circuit is just that shown in FIG. 1, and the entire array substrate will operate normally.

According to this mode, it is able to perform the control in a simpler and more flexible manner as compared with the circuit as shown in FIG. 2.

The switch circuit in FIG. 3 may be controlled in two modes. In a first control mode, one external controller may be provided with respect to each row of gate lines separately, and a signal from the external controller may be in synchronization with the gate driving signal of the corresponding gate line. As shown in FIG. 3, the first switch unit is a first TFT which is in the OFF state when the gate electrode is at a high level, the second switch unit is a second TFT which is in the ON state when the gate electrode is at the high level, the gate electrodes of the first TFT and the second TFT are connected to the external controller, and the signal from the external controller is in synchronization with the gate driving signal.

Figure 1:
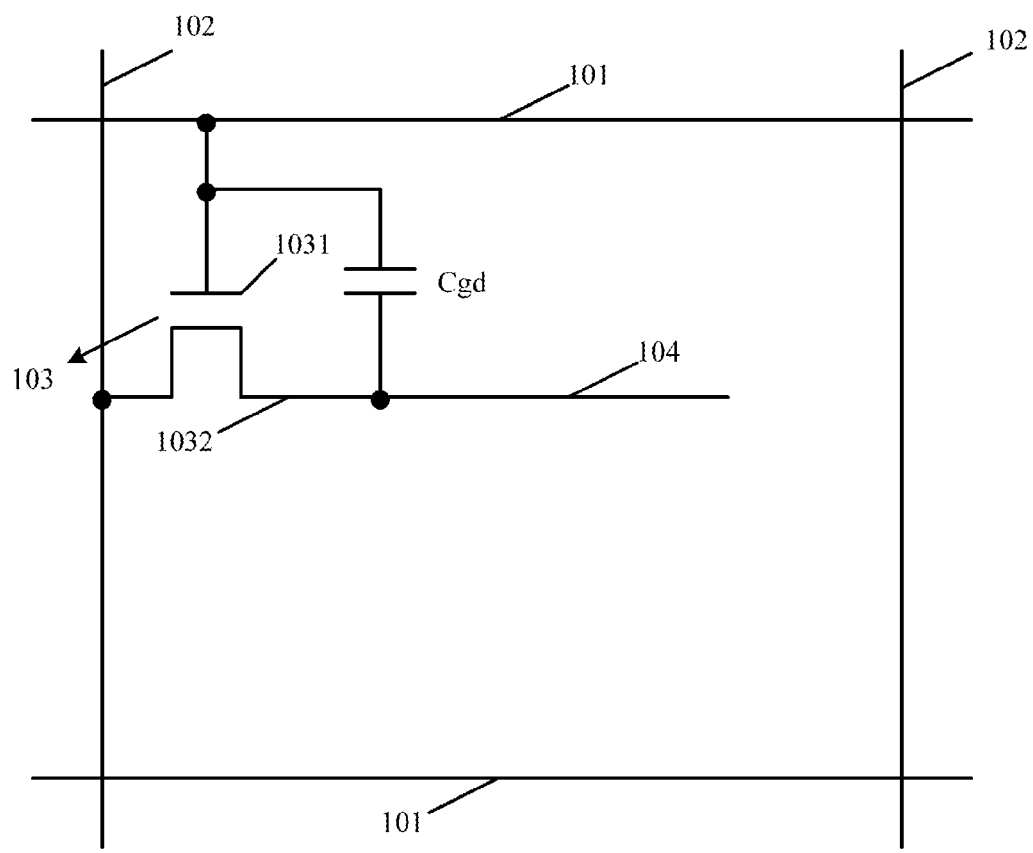
FIG. 1 is an equivalent circuit diagram of an existing array substrate.

In this mode, because a control signal is in synchronization with, i.e., identical to, the gate driving signal, it will be at a high level when the gate driving signal is at a high level. The first TFT (i.e., the first switch unit 201) is in the OFF state, and the second TFT (i.e., the second switch unit 202) is in the ON state. At this time, the circuit structure as shown in FIG. 1 will be obtained, and the array substrate will operate normally.

When the gate driving signal jumps from a high level, the control signal will jump too. Hence, the first TFT (i.e., the first switch unit 201) is in the ON state and the second TFT (i.e., the second switch unit 202) is in the OFF state. At this time, both ends of the parasitic capacitor are electrically connected, so as to prevent the charges within the parasitic capacitor from moving, thereby to maintain an electric field between the pixel electrode and the common electrode to be unchanged.

When the gate driving signal is at a low level, the control signal will be at a low level too. Hence, the first TFT (i.e., the first switch unit 201) is in the ON state and the second TFT (i.e., the second switch unit 202) is in the OFF state. At this time, the gate driving signal at the low level will not be outputted to the pixel electrode via the second switch unit. At a maintenance stage, the voltage of the pixel electrode will not be changed, and the array substrate will operate normally.

In a second control mode, the switch circuit in FIG. 3 may also be controlled directly by the gate driving signal, so this mode will be simpler. In this mode, the first switch unit is a first TFT which is in the OFF state when its gate electrode is at a high level, the second switch is a second TFT which is in the ON sate when its gate electrode is at a high level, and the gate electrodes of the first TFT and the second TFT are electrically connected to the gate line.

This control mode differs from the first control mode merely in the control signal, and the operating modes are completely the same, which will thus not be repeated herein.

The present disclosure further discloses in an embodiment a display panel including the above-mentioned array substrate.

The present disclosure further discloses in an embodiment a display device including the above-mentioned display panel. The display panel may be any product or member having a display function, e.g., a liquid crystal panel, an electronic paper, an OLED panel, a mobile phone, a flat-panel PC, a TV, a display, a laptop PC, a digital photo frame, and a navigator.

The above are merely the preferred embodiments of the present disclosure. It should be appreciated that, a person skilled in the art may make further improvements and modifications without departing from the principle of the present disclosure, and these improvements and modifications shall also fall within the scope of the present disclosure.

What is claimed is:

1. An array substrate, comprising:
    a plurality of data lines and a plurality of gate lines, configured to divide a display region into a plurality of display sub-regions;
    a pixel electrode arranged at each display sub-region; and
    a TFT arranged at each display sub-region, a source electrode of the TFT being electrically connected to the data line, a drain electrode of the TFT being electrically connected to the pixel electrode and a gate electrode of the TFT being electrically connected to the gate line,
    wherein a parasitic capacitor is formed between the gate electrode and the drain electrode of the TFT, and
    the array substrate further comprises:
    a switch circuit configured to enable both ends of the parasitic capacitor to be electrically connected when a gate driving signal of the TFT is changed from a high level to a low level,
    wherein the switch circuit comprises:
    a first switch unit arranged at at least one display sub-region, and connected in parallel to the parasitic capacitor formed on the TFT at the corresponding display sub-region; and
    a second switch unit arranged in correspondence with the first switch unit,
    wherein one end of a parallel circuit formed by the parasitic capacitor and the first switch unit is electrically connected to the drain electrode of the TFT, and another end of the parallel circuit is electrically connected to the gate electrode of the TFT via the second switch unit, and
    the first switch unit is in the ON state and the second switch unit is in the OFF state when the gate driving signal of the TFT at the corresponding display sub-region is changed from a high level to a low level.

2. The array substrate according to claim 1, wherein the switch circuit comprises:
    a first switch unit arranged at at least one display sub-region, and connected in parallel to the parasitic capacitor formed on the TFT at the corresponding display sub-region,
    wherein one end of a parallel circuit formed by the parasitic capacitor and the first switch unit is electrically connected to the drain electrode of the TFT, and another end of the parallel circuit is electrically connected to the gate electrode of the TFT, and
    the first switch unit is in an ON state when the gate driving signal of the TFT at the corresponding display sub-region is changed from a high level to a low level, and otherwise the first switch unit is in an OFF state.

3. The array substrate according to claim 2, wherein an external controller is used to control the first switch unit to be in the ON state when the gate driving signal is changed from a high level to a low level, and otherwise control the first switch unit to be in the OFF state.

4. The array substrate according to claim 3, wherein the external controller is provided with respect to each row of gate lines, and a signal from the external controller is in synchronization with the gate driving signal of the corresponding gate line.

5. The array substrate according to claim 4, wherein the first switch unit is a TFT element, a gate electrode of which is connected to the external controller, a source electrode of which is connected to the gate electrode of the TFT, and a drain electrode of which is connected to the drain electrode of the TFT.

6. The array substrate according to claim 1, wherein the first switch element is a first TFT which is in an OFF state when its gate electrode is at a high level, the second switch unit is a second TFT which is in an ON state when its gate electrode is at a high level, and the gate electrodes of the first TFT and the second TFT are electrically connected to the gate line.

7. The array substrate according to claim 1, wherein an external controller is provided with respect to each row of gate lines, a signal from the external controller is in synchronization with the gate driving signal of the corresponding gate lines, the first switch unit is a first TFT which is in an OFF state when its gate electrode is at a high level, the second switch unit is a second TFT which is in an ON state when its gate electrode is at a high level, and the gate electrodes of the first TFT and the second TFT are electrically connected to the external controller.

8. A display panel comprising the array substrate according to claim 1.

9. A display device comprising the display panel according to claim 8.

10. The display panel according to claim 8, wherein the switch circuit comprises:
    a first switch unit arranged at at least one display sub-region, and connected in parallel to the parasitic capacitor formed on the TFT at the corresponding display sub-region,
    wherein one end of a parallel circuit formed by the parasitic capacitor and the first switch unit is electrically connected to the drain electrode of the TFT, and another end of the parallel circuit is electrically connected to the gate electrode of the TFT, and
    the first switch unit is in an ON state when the gate driving signal of the TFT at the corresponding display sub-region is changed from a high level to a low level, and otherwise the first switch unit is in an OFF state.

11. The display panel according to claim 10, wherein an external controller is used to control the first switch unit to be in the ON state when the gate driving signal is changed from a high level to a low level, and otherwise control the first switch unit to be in the OFF state.

12. The display panel according to claim 11, wherein the external controller is provided with respect to each row of gate lines, and a signal from the external controller is in synchronization with the gate driving signal of the corresponding gate line.

13. The display panel according to claim 12, wherein the first switch unit is a TFT element, a gate electrode of which is connected to the external controller, a source electrode of which is connected to the gate electrode of the TFT, and a drain electrode of which is connected to the drain electrode of the TFT.

14. The display panel according to claim 8, wherein the first switch element is a first TFT which is in an OFF state when its gate electrode is at a high level, the second switch unit is a second TFT which is in an ON state when its gate electrode is at a high level, and the gate electrodes of the first TFT and the second TFT are electrically connected to the gate line.

15. The display panel according to claim 8, wherein an external controller is provided with respect to each row of gate lines, a signal from the external controller is in synchronization with the gate driving signal of the corresponding gate lines, the first switch unit is a first TFT which is in an OFF state when its gate electrode is at a high level, the second switch unit is a second TFT which is in an ON state when its gate electrode is at a high level, and the gate electrodes of the first TFT and the second TFT are electrically connected to the external controller.

* * * * *